(12) United States Patent
Liu et al.

(10) Patent No.: US 11,806,957 B2
(45) Date of Patent: Nov. 7, 2023

(54) LIGHT GUIDE FILM PRODUCT PROCESSING APPARATUS

(71) Applicant: NANJING BREADY ELECTRONICS CO., LTD., Nanjing (CN)

(72) Inventors: Yong Liu, Nanjing (CN); Yonggang Li, Nanjing (CN)

(73) Assignee: NANJING BREADY ELECTRONICS CO., LTD., Nanjing (CN)

( * ) Notice: Subject to any disclaimer, the term of this patent is extended or adjusted under 35 U.S.C. 154(b) by 770 days.

(21) Appl. No.: 16/965,763

(22) PCT Filed: Jun. 10, 2020

(86) PCT No.: PCT/CN2020/095424
§ 371 (c)(1),
(2) Date: Jul. 29, 2020

(87) PCT Pub. No.: WO2020/177785
PCT Pub. Date: Sep. 10, 2020

(65) Prior Publication Data
US 2021/0213694 A1 Jul. 15, 2021

(30) Foreign Application Priority Data
Apr. 15, 2020 (CN) .................... 202010293796.X

(51) Int. Cl.
*B29D 11/00* (2006.01)
(52) U.S. Cl.
CPC .. *B29D 11/00951* (2013.01); *B29D 11/00721* (2013.01); *B29D 11/00788* (2013.01)
(58) Field of Classification Search
CPC .................... B29D 11/00721; B29D 11/00788
See application file for complete search history.

(56) References Cited

U.S. PATENT DOCUMENTS

| 8,500,318 B2* | 8/2013 | Fang | G02B 6/0043 |
| | | | 362/624 |
| 2015/0251341 A1* | 9/2015 | Makuta | B44C 1/1712 |
| | | | 428/156 |
| 2017/0023729 A1* | 1/2017 | Kuo | B29C 59/04 |

FOREIGN PATENT DOCUMENTS

CN 101526641 A * 9/2009
CN 101554761 A * 10/2009
(Continued)

OTHER PUBLICATIONS

First Office Action for application CN 202010293796, dated Dec. 25, 2020 (Year: 2020).*

(Continued)

*Primary Examiner* — Timothy Kennedy
(74) *Attorney, Agent, or Firm* — HAUPTMAN HAM, LLP

(57) ABSTRACT

The light guide film product processing apparatus provided in the present invention relates to the field of light guide film processing, and includes an unwinding device for transmitting a first light guide film, a dot processing device, a cooling device, a cutting device, a waste collecting device, and a product collecting device that are sequentially installed along the transmission direction of the first light guide film, and a linkage controller; the dot processing device transfers dots on both sides of the first light guide film, the cooling device cools the first light guide film after dot processing, the cutting device cuts the cooled first light guide film, the waste collecting device is configured to wind a second light guide film, and the second light guide film is a remaining material after the first light guide film is cut into a light guide film product; and the included angle formed between the winding and transmission direction of the second light guide film and the transmission direction of the first light guide film is defined as α, where α>0. The linkage controller (Continued)

controls the starting and stopping of the dot processing device, the cooling device, and the cutting device by means of a program to implement the integrated production process of one-step forming of dots on both sides of a light guide film, light guide film product cutting, and remaining material recovery.

10 Claims, 2 Drawing Sheets

(56) References Cited

FOREIGN PATENT DOCUMENTS

| | | | | |
|---|---|---|---|---|
| CN | 101885236 A | * | 11/2010 | |
| CN | 101937115 B | * | 11/2013 | ........... B32B 37/203 |
| CN | 207387820 U | * | 5/2018 | |
| CN | 108790226 A | * | 11/2018 | |
| KR | 20090089697 A | * | 8/2009 | |
| KR | 20100039681 A | * | 4/2010 | |
| KR | 20140058303 A | * | 5/2014 | ............. B29C 39/18 |
| TW | 1438510 B | * | 5/2014 | |
| WO | WO-2008053782 A1 | * | 5/2008 | ............. B29C 39/18 |

OTHER PUBLICATIONS

Nth Office Action for application CN 202010293796, dated May 25, 2021 (Year: 2021).*

English translation of Written Opinion for PCT/CN2020/095424, dated Jan. 14, 2021 (Year: 2021).*

* cited by examiner

LIGHT GUIDE FILM PRODUCT PROCESSING APPARATUS

RELATED APPLICATIONS

The present application is a National Phase of International Application Number PCT/CN2020/095424, filed Jun. 10, 2020, and claims the priority of China Application No. 202010293796.X, filed Apr. 15, 2020.

TECHNICAL FIELD

The present invention relates to the field of light guide film processing, and in particular, to a light guide film product processing apparatus.

BACKGROUND

With the development of social technology, multiple procedures of a light guide film from compounding to cutting into a product have gradually formed an integrated industry. In the integrated production process, based on the requirements for the performance of the light guide film, a light guide film dot unit is included. The existing light guide film dot processing is generally performed on a light guide plate by means of injection molding or printing. However, it is difficult for the conventional injection molding or printing to achieve the thinning design of the light guide plate. At present, the processing approach for manufacturing light guide film dots gradually tends to be integrated design and one-step forming, thus simplifying the manufacturing process and saving costs. Therefore, the processing method for integrally forming light guide film dots is the currently preferred approach for light guide film dot processing.

In the prior art, the dot processing is mostly single-sided processing or the processing of dots on both sides of the light guide film is implemented stepwise, which cannot satisfy the social needs for the gradual improvement of the performance of the light guide film. Certainly, in the prior art, there are also apparatus improvements to implement the one-step forming of dots on both sides of the light guide film. For example, the patent CN101937115 discloses a light guide film manufacturing apparatus, which processes dots on the surface of a light guide film to be processed by means of cooperation of pressing rollers and plate rollers. Although this method can implement the one-step forming of dots on the surface of the film, there will be a step speed difference in the process that film running cooperates with the rotation of the rollers, and therefore, damage may be caused to the surface of the film when the dots are imprinted.

In addition, in the integrated production process, when the light guide film is cut into a product, it is usual to cut off the excess width of the light guide film along its transmission direction, and then the light guide film is further cut into the product of a required size. Only one model of light guide film products can be produced on a production line. For the production of light guide film products of different sizes, new production lines need to be added, resulting in an increase in production costs.

SUMMARY

The purpose of the present invention is to provide a light guide film product processing apparatus, which implements the simultaneous processing of the dots on the surfaces of both sides of a light guide film and product cutting, so that damage to the surface of the light guide film can be avoided, and light guide film products of various sizes can be obtained.

The present invention provides the following technical solution: a light guide film product processing apparatus, including an unwinding device, a dot processing device, a cooling device, a cutting device, a waste collecting device, a product collecting device, and a linkage controller; the unwinding device is configured to unwind and transmit a first light guide film, and the first light guide film is a light guide film of unformed dots; the dot processing device, the cooling device, and the cutting device are sequentially installed along the transmission direction of the first light guide film, and the dot processing device, the cooling device, and the cutting device are electrically connected to the linkage controller respectively; the dot processing device is configured to transfer the dots on both sides of the first light guide film, the cooling device is configured to cool the first light guide film after dot processing, and the cutting device is configured to cut the cooled first light guide film to obtain a light guide film product; the waste collecting device is configured to wind a second light guide film, and the second light guide film is a remaining material after the first light guide film is cut into the light guide film product; the product collecting device is configured to collect the light guide film product; and the included angle formed between the winding and transmission direction of the second light guide film and the transmission direction of the first light guide film is defined as $\alpha$, where $\alpha > 0$.

By adjusting the included angle between the winding and transmission direction of the second light guide film and the transmission direction of the first light guide film, the separation of the second light guide film from the light guide film product is implemented, remaining material recovery and product collection are simultaneously implemented, the structure is simple, and the operation is convenient.

Further, the dot processing device includes a first pressurizing device and a second pressurizing device, a first mold base and a second mold base, and a first hot-pressing mold and a second hot-pressing mold, which are symmetrically disposed in the thickness direction of the first light guide film respectively; the first mold base is installed on the side of the first pressurizing device close to the first light guide film, the first hot-pressing mold is disposed on the side of the first mold base close to the first light guide film, and the plane of the first hot-pressing mold is parallel to the surface of the first light guide film; the second mold base is installed on the side of the second pressurizing device close to the first light guide film, the second hot-pressing mold is disposed on the side of the second mold base close to the first light guide film, and the plane of the second hot-pressing mold is parallel to the surface of the first light guide film; a heating unit is provided inside each of the first mold base and the second mold base, and the heating unit is configured to heat to soften the first light guide film; the linkage controller is configured to control to drive the first pressurizing device and the second pressurizing device to move toward or away from each other along the thickness direction of the first light guide film, and when the first pressurizing device and the second pressurizing device move toward each other, the linkage controller at least causes the first hot-pressing mold and the second hot-pressing mold to abut against the surface of the first light guide film; and the linkage controller is also configured to control the starting and stopping of the heating unit inside the first mold base and the second mold base by means of a program, so that the first hot-pressing mold and the second hot-pressing mold transfer dots on the surface of the first light guide film.

Further, the cutting device includes a third pressurizing device, a third mold base, a cutting mold, and a cutting platform; the third pressurizing device is installed on the same side as the first pressurizing device, the third mold base is installed on the side of the third pressurizing device close to the first light guide film, and the cutting mold is detachably installed on the side of the third mold base close to the first light guide film; the cutting platform is installed on the same side as the second pressurizing device, the side of the cutting platform close to the first light guide film is provided with a first conveyor belt with a conveying plane parallel to the first light guide film; and the first conveyor belt corresponds to the position of the cutting mold along the thickness direction of the first light guide film, and the conveying plane of the first conveyor belt close to the first light guide film abuts against the first light guide film.

The cutting mold is detachably connected to the third mold base, facilitating suspending the production line immediately, and replacing the cutting mold to obtain light guide film products of different sizes; and the first conveyor belt can be replaced after traces are left when the first light guide film is cut by the cutting mold for many times to protect the cutting platform.

Further, the side of the third mold base close to the first light guide film is provided with a connecting portion electrically connected to the linkage controller, and the connecting portion is detachably connected to the cutting mold; and the transmission direction of the first light guide film is defined as the front, and then the connecting portion has a degree of freedom to rotate parallel to the first light guide film on the third mold base, and a degree of freedom to translate along the front, back, left, and right. The movement of the connecting portion drives the cutting mold to change the position, facilitating fine adjustment when an offset is caused in the transmission process of the first light guide film, not influencing the quality of the light guide film product.

Further, one side of the first hot-pressing mold is provided with a plurality of marking dots that protrude toward the first light guide film side, and the marking dots are configured to print a mark on the first light guide film; a plurality of CCD positioning cameras are provided on the same side of the outer wall of the third mold base as the first hot-pressing mold that is provided with the marking dots, and the number and positions of the CCD positioning cameras correspond to the number and positions of the marking dots; the CCD positioning cameras are electrically connected to the linkage controller, and are configured to identify the marks on the first light guide film, and generate a sensing signal and send same to the linkage controller; and after receiving the sensing signal, the linkage controller controls to start the cutting device.

Further, the first mold base and the second mold base have the same structure; the first mold base or the second mold base is uniformly provided with a plurality of grooves on the same straight line along its side close to the first light guide film, the first hot-pressing mold is partially embedded in the grooves of the first mold base along its thickness direction, and the second hot-pressing mold is partially embedded in the grooves of the second mold base along its thickness direction; and the heating unit is provided as an electric heating unit, the heat transfer plane of the electric heating unit is parallel to the first light guide film. The electric heating unit softens the surface of the light guide film, dot transfer is faster and the transfer effect is better.

Further, the width of the first light guide film is defined as D, the width of the side of the first mold base close to the first light guide film along the width direction of the first light guide film is D1, and the width of the side of the second mold base close to the first light guide film along the width direction of the first light guide film is D2, then D1>D and D2>D. The dot formation along the width direction of the first light guide film can be completed at one time by means of the selection of the sizes of the first and second mold bases, thereby improving processing efficiency.

Further, the cooling device includes a first air supply unit and a second air supply unit, and a first air extraction unit and a second air extraction unit, which are symmetrically disposed in the thickness direction of the first light guide film; the first air supply unit includes a first chamber with an opening facing the first light guide film and a blower connected to the first chamber by means of a pipeline, and the first air extraction unit includes a second chamber with an opening facing the first light guide film and an air extractor connected to the second chamber by means of a pipeline; the second chamber is disposed in the first chamber, and the distance between the plane where the opening of the second chamber is located and the first light guide film is not less than the distance between the plane where the opening of the first chamber is located and the first light guide film; the second air supply unit includes a third chamber with an opening facing the first light guide film and a blower connected to the third chamber by means of a pipeline, and the second air extraction unit includes a fourth chamber with an opening facing the first light guide film and an air extractor connected to the fourth chamber by means of a pipeline; and the fourth chamber is disposed in the third chamber, and the distance between the plane where the opening of the fourth chamber is located and the first light guide film is not less than the distance between the plane where the opening of the third chamber is located and the first light guide film.

The first air supply unit and the second air supply unit cool the first light guide film after the dot processing, and the first air extraction unit and the second air extraction unit draw the hot air after heat exchange on the surface of the first light guide film, so as to accelerate the cooling of the first light guide film after the dot processing, facilitating the dot formation, thereby improving production efficiency.

Further, the width of the first light guide film is defined as D, the width of the opening of the first air supply unit along the width direction of the first light guide film is D3, and the width of the opening of the second air supply unit along the width direction of the first light guide film is D4, then D3>D and D4>D; and the selection of the sizes of the openings of the first and second air supply units facilitates the overall cooling of the first light guide film, thus reducing the influence of the unevenness of the cooling on the performance of the first light guide film.

Further, the light guide film product processing apparatus further includes a first guide wheel group and a second guide wheel group each provided with two guide wheels, and a product conveying device disposed between the cutting device and the product collecting device; the first guide wheel group is disposed between the unwinding device and the dot processing device, the two guide wheels of the first guide wheel group are symmetrically disposed on both sides in the thickness direction of the first light guide film, and the two guide wheels abut on the surface of the first light guide film respectively; the second guide wheel group is disposed between the cutting device and the product conveying device, the two guide wheels of the second guide wheel group are symmetrically disposed on both sides in the thickness direction of the second light guide film, and the two guide wheels abut on the surface of the second light guide film respectively; the product conveying device is installed at an interval from the second guide wheel group, the product conveying device is configured as a second conveyor belt with a conveying plane parallel to the first light guide film, the second conveyor belt and the first conveyor belt are on the same straight line, and the conveying plane of the second conveyor belt close to the first light guide film is located on the same plane as the conveying plane of the first conveyor belt close to the first light guide film; and the length of the light guide film product along the transmission direction of the first light guide film is defined as d1, the installation interval between the product conveying device and the second guide wheel group is d2, and the installation interval between the second guide wheel group and the first conveyor belt is d3, then $d2<1/2d1$ and $d3<1/2d1$.

The provision of two guide wheel groups facilitates the smoothing of the surface of the first light guide film when transmitted through the dot processing device, the cooling device, and the cutting device, and the second conveyor belt is installed at an interval from the second guide wheel group. The main purpose is to transmit and collect the light guide film product separated from the second light guide film.

It can be known from the above technical solution that the light guide film product processing apparatus provided in the technical solution of the present invention has the following beneficial effects:

The light guide film product processing apparatus disclosed in the present invention includes an unwinding device for transmitting a first light guide film, a dot processing device, a cooling device, a cutting device, a waste collecting device, and a product collecting device that are sequentially installed along the transmission direction of the first light guide film, and a linkage controller; the dot processing device transfers dots on both sides of the first light guide film, the cooling device cools the first light guide film after dot processing, the cutting device cuts the cooled first light guide film, the waste collecting device is configured to wind a second light guide film, and the second light guide film is a remaining material after the first light guide film is cut into a light guide film product; and the included angle that is not zero is formed between the winding and transmission direction of the second light guide film and the transmission direction of the first light guide film. The linkage controller controls the starting and stopping of the dot processing device, the cooling device, and the cutting device by means of a program to implement the integrated production process of one-step forming of dots on both sides of a light guide film, light guide film product cutting, and remaining material recovery.

The present invention has a simple structure. The dot processing device uses two pressurizing devices, two mold bases, and two hot-pressing molds which work together to achieve the effect of having different dots on both sides of the light guide film, so that the optical performance of the light guide film product is greatly improved, the product quality is high, and the model of the hot-pressing modes can be adjusted, so the dot processing device can be used for the processing of light guide films of different dot structures and sizes; the cooling device uses two air supply units and two air extraction units which work together to achieve cooling heat exchange of the first light guide film so as to achieve rapid cooling; and the cutting device uses a third mold base and a cutting mold cooperating with a cutting platform to implement the cutting of light guide film products of different sizes and shapes. By using the dot processing device, the cooling device, and the cutting device, the present invention can effectively improve the quality of the light guide film product, increase product types, and effectively improve product processing efficiency. The present invention is more widely applied in production.

It should be understood that all combinations of the foregoing concepts and additional concepts described below in more detail can be considered as part of the subject matter of the invention of the present disclosure as long as such concepts do not contradict each other.

The foregoing and other aspects, embodiments and features taught in the present invention can be more fully understood from the following description with reference to the drawings. Other additional aspects of the present invention, such as features and/or beneficial effects of exemplary embodiments, are apparent in the following description, or are obtained from the practice of specific embodiments taught in the present invention.

BRIEF DESCRIPTION OF THE DRAWINGS

The drawings are not intended to be drawn in proportion. In the drawings, each same or approximately same component shown in each drawing can be denoted by the same reference numeral. For the sake of clarity, not every component is marked in each drawing. Now, embodiments of various aspects of the present invention are described by examples and with reference to the drawings, in which.

Figure 1:
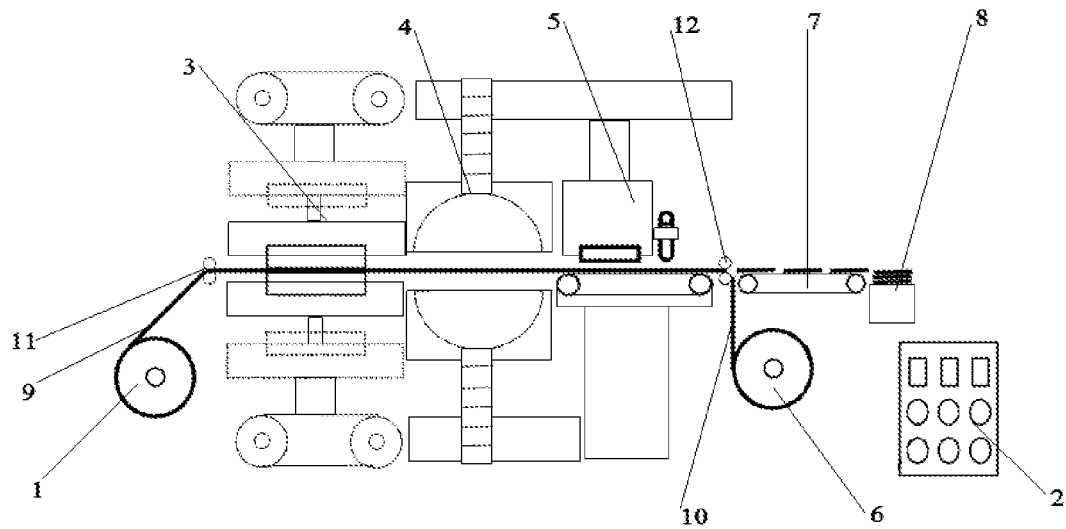
FIG. 1 is a specific structural diagram of the present invention.

The specific meanings of the reference numerals in the drawings are:

1—unwinding device, 2—linkage controller, 3—dot processing device, 3.1—first pressurizing device, 3.2—second pressurizing device, 3.3—first mold base, 3.4—second mold base, 3.5—first hot-pressing mold, 3.6—second hot-pressing mold, 3.7—groove, 3.8—heating unit, 4—cooling device, 4.1—first air supply unit, 4.2—second air supply unit, 4.3—first air extraction unit, 4.4—second air extraction unit, 5—cutting device, 5.1—third pressurizing device, 5.2—third mold base, 5.3—cutting mold, 5.4—cutting platform, 5.5—first conveyor belt, 5.6—CCD positioning camera, 6—waste collecting device, 7—product conveying device, 8—product collecting device, 9—first light guide film, 10—second light guide film, 11—first guide wheel group, 12—second guide wheel group.

DETAILED DESCRIPTION

In order to better understand the technical content of the present invention, specific embodiments are specially listed and are described below with reference to the drawings.

Various aspects of the present invention are described in the present disclosure with reference to the drawings, in which many illustrated embodiments are shown. The embodiments of the present disclosure are not defined to include all aspects of the present invention. It should be understood that various concepts and embodiments described above, as well as those concepts and embodiments described below in more detail can be implemented in any of many ways, because the concepts and embodiments disclosed in the present invention do not limited to any embodiment. In addition, some aspects of the present disclosure may be used separately or in any appropriate combination with other aspects of the present disclosure.

The "first", "second", and similar words used in the description and claims of the present application do not indicate any order, quantity or importance, but are only used to distinguish different components. Similarly, unless the context clearly dictates other cases, similar words such as "one", "a", or "the" in the singular form do not indicate a quantity limit, but indicate that there is at least one. Similar words such as "include" or "comprise" mean that the element or object appearing before "include" or "comprise" covers the features, whole, steps, operations, elements, and/or components listed after "comprise" or "include", does not exclude the presence or addition of one or more other features, whole, steps, operations, elements, components, and/or collections thereof "Front", "back", "left", "right", etc. are only used to indicate a relative positional relationship. When the absolute position of the described object changes, the relative positional relationship may also change accordingly.

In the prior art, on the one hand, in the existing processing of the dots on the surface of a light guide film, a roller structure that can rotate around a roller axis is mainly used to transfer dots on the surface of the light guide film, and based on a possible step speed difference between the roller and the light guide film, damage may be caused to the surface of the light guide film. On the other hand, only the same type of light guide film products can be produced on the existing light guide film product line, and different types of products cannot be produced on the same production line, thus causing an increase in the production costs of enterprises. The purpose of the present application is to propose a light guide film product processing apparatus, which simultaneously performs processing of dots on both sides of a light guide film without damage, thereby producing different types of light guide products while improving the optical performance and quality of the light guide film, and achieving high production efficiency.

The light guide film product processing apparatus of the present invention will be further specifically described below with reference to the embodiments shown in the drawings.

Referring to FIG. 1, a light guide film product processing apparatus includes an unwinding device 1, a dot processing device 3, a cooling device 4, a cutting device 5, a waste collecting device 6, a product collecting device 8, and a linkage controller 2. The unwinding device 1 is configured to unwind and transmit the first light guide film 9, and the first light guide film 9 is a light guide film of unformed dots; the dot processing device 3, the cooling device 4, and the cutting device 5 are sequentially installed along the transmission direction of the first light guide film 9, and the dot processing device 3, the cooling device 4, and the cutting device 5 are electrically connected to the linkage controller 2 respectively; the dot processing device 3 is configure to transfer dots on both sides of the first light guide film 9, the cooling device 4 is configured to cool the first light guide film 9 after dot processing, and the cutting device 5 is configured to cut the cooled first light guide film 9 to obtain a light guide film product; the waste collecting device 6 is configured to wind a second light guide film 10, and the second light guide film 10 is a remaining material after the first light guide film 9 is cut into the light guide film product; the product collecting device 8 is configured to collect the light guide film product; and the included angle formed between the winding and transmission direction of the second light guide film 10 and the transmission direction of the first light guide film 9 is defined as α, where α>0.

The light guide film of unformed dots is sequentially subjected to dot transfer, cooling, cutting, and separation to obtain the remaining material and product. In the embodiment shown in the drawings, a first light guide film roll is directly placed in the unwinding device 1, the first light guide film 9 is transmitted from the unwinding device 1 to the dot processing device 3, and the second light guide film 10 and the product after cutting are separated from the light guide film product under the effect of the winding force of the waste collecting device 6. The specific operation is to adjust the included angle between the winding and transmission direction of the second light guide film 10 and the transmission direction of the first light guide film 9, the structure is simple, and the operation is convenient. In this embodiment, an included angle of 90 degrees is formed between the winding direction of the second light guide film 10 by the waste collecting device 6 and the transmission direction of the first light guide film 9.

Figure 2:
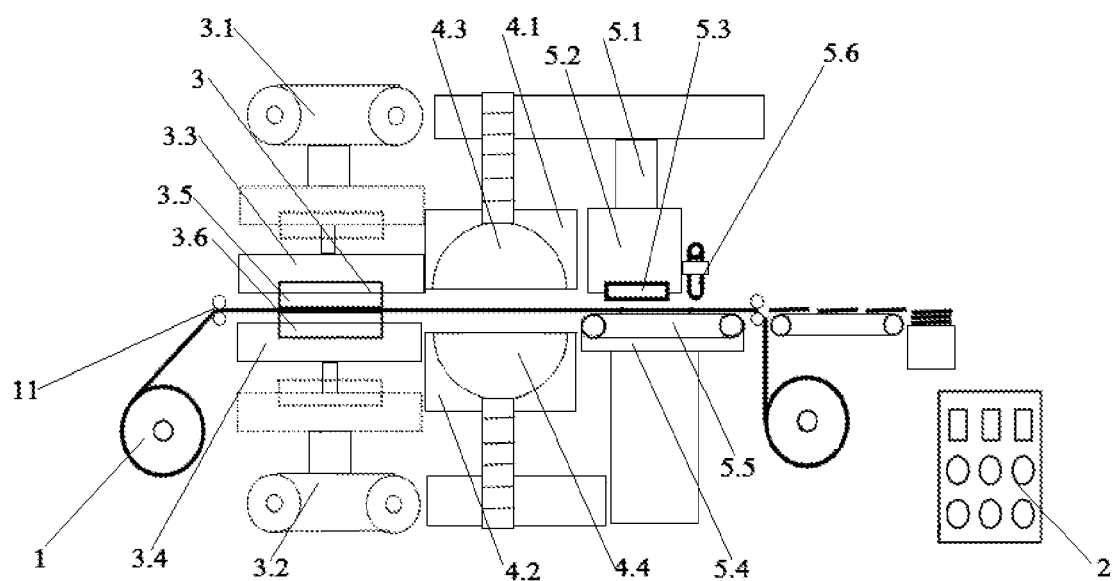
FIG. 2 is a specific structural diagram of the present invention.

Referring to FIG. 2, the dot processing device 3 includes a first pressurizing device 3.1 and a second pressurizing device 3.2, a first mold base 3.3 and a second mold base 3.4, and a first hot-pressing mold 3.5 and a second hot-pressing mold 3.6, which are symmetrically disposed in the thickness direction of the first light guide film 9 respectively; the first mold base 3.3 is installed on the side of the first pressurizing device 3.1 close to the first light guide film 9, the first hot-pressing mold 3.5 is disposed on the side of the first mold base 3.3 close to the first light guide film 9, and the plane of the first hot-pressing mold 3.5 is parallel to the surface of the first light guide film 9; the second mold base 3.4 is installed on the side of the second pressurizing device 3.2 close to the first light guide film 9, the second hot-pressing mold 3.6 is disposed on the side of the second mold base 3.4 close to the first light guide film 9, and the plane of the second hot-pressing mold 3.6 is parallel to the surface of the first light guide film 9; and a heating unit 3.8 is provided inside each of the first mold base 3.3 and the second mold base 3.4, and the heating unit 3.8 is configured to heat to soften the first light guide film 9.

The linkage controller 2 is configured to control to drive the first pressurizing device 3.1 and the second pressurizing device 3.2 to move toward or away from each other along the thickness direction of the first light guide film 9, and when the first pressurizing device 3.1 and the second pressurizing device 3.2 move toward each other, the linkage controller 2 at least causes the first hot-pressing mold 3.5 and the second hot-pressing mold 3.6 to abut against the surface of the first light guide film 9; that is, when the first pressurizing device 3.1 and the second pressurizing device 3.2 move toward each other, the first pressurizing device 3.1 drives the first mold base 3.3 and the first hot-pressing mold 3.5 thereon to press one side surface of the first light guide film 9, and the second pressurizing device 3.2 drives the second mold base 3.4 and the second hot-pressing mold 3.6 thereon to press the other side surface of the first light guide film 9, then the dot structures on the first hot-pressing mold 3.5 and the second hot-pressing mold 3.6 are transferred on the surface of the first light guide film 9. In order to ensure the efficiency of dot transfer, the linkage controller 2 is further configured to control the starting and stopping of the heating unit 3.8 inside the first mold base 3.3 and the second mold base 3.4 by means of a program, and the heating unit 3.8 helps to soften the surface of the light guide film 9, so that the first hot-pressing mold 3.5 and the second hot-pressing mold 3.6 form dots on the surface of the light guide film.

In some embodiments, a distance sensor electrically connected to the linkage controller 2 is provided on the side of the first pressurizing device 3.1 and the second pressurizing device 3.2 close to the first light guide film 9 to prevent the first pressurizing device 3.1 the second pressurizing device 3.2 from moving toward each other, so as to achieve the effect of controlling dot transfer without damaging the light guide film 9. In addition, in order to further improve the scope of application of the present invention, in the embodiments, the first hot-pressing mold 3.5 is detachably connected to the inner walls of the grooves 3.7 of the first mold base 3.3, and the second hot-pressing mold 3.6 is detachably connected to the inner walls of the grooves 3.7 of the second mold base 3.4. By means of the detachable connection, the hot-pressing molds with different dot structures in the apparatus can be replaced according to production needs, thus saving costs, improving efficiency, and reducing the development cycle, etc. For example, the first hot-pressing mold 3.5 is a mirror mold, a dot mold, or a V structure mold, and the second hot-pressing mold 3.6 is a mirror mold, a dot mold, or a V structure mold. Certainly, the structures of the first hot-pressing mold 3.5 and the second hot-pressing mold 3.6 are far more than the above listed structures, and the dot structure can also be designed independently according to production requirements.

Figure 3:
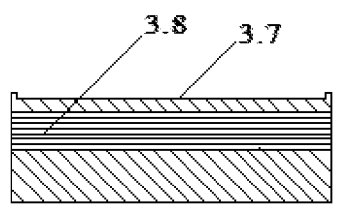
FIG. 3 is a cross-sectional view of a first mold base along the width direction of a first light guide film.
Figure 4:
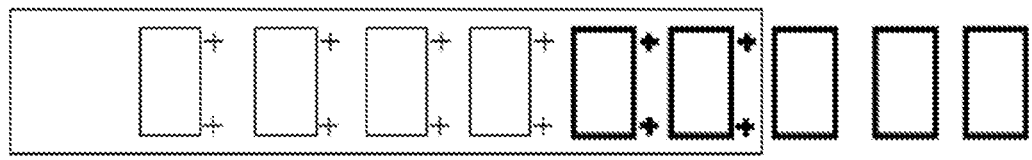
FIG. 4 is a diagram showing the effect of conveying a light guide film product on a first conveyor belt and a product conveying device.

Referring to FIG. 3, the first mold base 3.3 and the second mold base 3.4 have the same structure; the side of the first mold base 3.3 or the second mold base 3.4 close to the first light guide film 9 is uniformly provided with a plurality of grooves 3.7 on the same straight line, the first hot-pressing mold 3.5 is partially embedded in the grooves 3.7 of the first mold base 3.3 along its thickness direction, and the second hot-pressing mold 3.6 is partially embedded in the grooves 3.7 of the second mold base 3.4 along its thickness direction; and the heating unit 3.8 is configured as an electric heating unit, such as an electric heating piece and an electric heating structure formed by weaving electric heating wires, and the heat transfer plane of the electric heating unit is parallel to the surface of the light guide film 9.

After dot formation, the first light guide film 9 continues to be transmitted to the cooling device 4, and the cooling device 4 implements the surface curing of the first light guide film 9 after the dot transfer. The cooling device 4 is disposed between the dot processing device 3 and the cutting device 5, which does not influence the transmission of the first light guide film 9, and the cooling and shaping of the film and the dot structures on the surface of the film in the transmission process of the first light guide film 9 is directly implemented, which does not influence the running speed of the production line, reduces the time consumed by direct film cooling during dot processing, and improves the processing efficiency of a light guide film product.

Specifically, the cooling device 4 includes a first air supply unit 4.1 and a second air supply unit 4.2, and a first air extraction unit 4.3 and a second air extraction unit 4.4, which are symmetrically disposed in the thickness direction of the first light guide film 9; the first air supply unit 4.1 includes a first chamber with an opening facing the first light guide film 9 and a blower connected to the first chamber by means of a pipeline, and the first exhaust unit 4.2 includes a second chamber with an opening facing the first light guide film 9 and an air extractor connected to the second chamber by means of a pipeline; the second chamber is disposed in the first chamber, and the distance between the plane where the opening of the second chamber is located and the first light guide film 9 is not less than the distance between the plane where the opening of the first chamber is located and the first light guide film 9; the second air supply unit 4.2 includes a third chamber opening facing the first light guide film 9 and a blower connected to the third chamber by means of a pipeline, and the second air extraction unit 4.4 includes a fourth chamber with an opening facing the first light guide film 9 and an air extractor connected to the fourth chamber by means of a pipeline; the fourth chamber is disposed in the third chamber, and the distance between the plane where the opening of the fourth chamber is located and the first light guide film 9 is not less than the distance between the plane where the opening of the third chamber is located and the first light guide film 9.

In the embodiments, the first air supply unit 4.1 and the second air supply unit 4.2 are used to cool and shape the first light guide film 9 and the dots on the surface of the film after dot processing, and the first air extraction unit 4.3 and the second air extraction unit 4.4 draw the hot air after heat exchange on the surface of the first light guide film 9, so as to accelerate the cooling of the first light guide film 9 after the dot processing, facilitating the dot formation, thereby improving production efficiency.

In some embodiments, the air supply units and the air extraction units of the cooling device are further improved. The hot air drawn by the air extraction units is cooled by heat exchange by a heat exchange device and then transmitted to the air supply units, so as to implement recycling of the air between the air supply units and the air extraction units.

Referring further to FIG. 2, the cutting device 5 includes a third pressurizing device 5.1, a third mold base 5.2, a cutting mold 5.3, and a cutting platform 5.4; the third pressurizing device 5.1 is installed on the same side as the first pressurizing device 3.1, the third mold base 5.2 is installed on the side of the third pressurizing device 5.1 close to the first light guide film 9, and the cutting mold 5.3 is detachably installed on the side of the third mold base 5.2 close to the first light guide film 9; the cutting platform 5.4 is installed on the same side as the second pressurizing device 3.2, and the side of the cutting platform 5.3 close to the first light guide film 9 is provided with a first conveyor belt 5.5 with a conveying plane parallel to the first light guide film 9; and the first conveyor belt 5.5 corresponds to the position of the cutting mold 5.3 along the thickness direction of the first light guide film 9, and the conveying plane of the first conveyor belt 5.5 close to the first light guide film 9 abuts against the first light guide film 9.

The cutting mold 5.3 is detachably connected to the third mold base 5.2, facilitating suspending the production line immediately in the production process of a light guide film product and using other types of cutting molds 5.3, so as to obtain light guide film products of different sizes and different models on the same production line. In addition, the first light guide film 9 is transmitted on the cutting platform 5.4 by using the first conveyor belt 5.5. On the one hand, the product does not fall onto the cutting platform after cut, and is transmitted to the product collecting device 8 by the first conveyor belt 5.5. On the one hand, the first conveyor belt 5.5 can be replaced after traces are left when the first light guide film 9 is cut by the cutting mold 5 for many times to protect the cutting platform 5.4.

Further, in order to prevent an unqualified cut light guide film product caused by a deviation when the first light guide film 9 is transmitted to the cutting device 5, one side of the first hot-pressing mold 3.5 is provided with a plurality of marking dots that protrude toward the first light guide film 9 side, and the marking dots are configured to print a mark on the first light guide film 9; a plurality of CCD positioning cameras 5.6 are provided on the same side of the outer wall of the third mold base 5.2 as the first hot-pressing mold 3.5 that is provided with the marking dots, the number and positions of the CCD positioning cameras 5.6 correspond to the number and positions of the marking dots, and the number is generally not less than 2. The CCD positioning cameras 5.6 are electrically connected to the linkage controller 2, and are configured to identify the marks on the first light guide film 9, and generate a sensing signal and send same to the linkage controller 2; and after receiving the sensing signal, the linkage controller 2 controls to start the cutting device 5 to perform cutting. Use of the CCD positioning cameras 5.6 to identify the marks can effectively prevent the cutting device 5 from cutting an unqualified product, thereby improving the qualification rate of the light guide film product.

In some embodiments, fine adjustment is performed by identifying the marks further by the CCD positioning cameras 5.6 when an offset is caused in the process that the first light guide film 9 is transmitted to the cutting device 5. Specifically, the recognition area of the CCD positioning camera 5.6 and the marking position without a deviation when the first light guide film 9 runs are set, the side of the third mold base 5.2 close to the first light guide film 9 is provided with a connecting portion electrically connected to the linkage controller 2, and the connecting portion is detachably connected to the cutting mold 5.3; the transmission direction of the first light guide film 9 is defined as the front, and then the connecting portion has a degree of freedom to rotate parallel to the first light guide film 9 on the third mold base 5.2, and a degree of freedom to translate along the front, back, left, and right; when identifying that the marking position on the first light guide film 9 deviates from the set identification position without a deviation when the first light guide film 9 runs, the CCD positioning cameras 5.6 generate a sensing signal indicating the deviation of the first light guide film 9 and sends the sensing signal to the linkage controller 2, after receiving the sensing signal, the linkage controller 2 controls the connecting portion to drive the cutting die 5.3 to finely adjust the position in the direction of deviation of the of the first light guide film 9, and the cutting device 5 starts cutting the light guide film product after the fine adjustment of the position of the cutting mold 5.3, thereby effectively improving the qualification rate of the product.

Referring further to FIGS. 1 and 2, in order to ensure the processing quality of the light guide film product, the light guide film product processing apparatus further includes a first guide wheel group 11 and a second guide wheel group 12 each provided with two guide wheels, and a product conveying device 7 disposed between the cutting device 5 and the product collecting device 8. The first guide wheel group 11 is disposed between the unwinding device 1 and the dot processing device 3, the two guide wheels of the first guide wheel group 11 are symmetrically disposed on both sides in the thickness direction of the first light guide film 9, and the two guide wheels abut on the surface of the first light guide film 9 respectively; the second guide wheel group 12 is disposed between the cutting device 5 and the product conveying device 7, and the two guide wheels of the second guide wheel group 12 are symmetrically disposed on both sides in the thickness direction of the second light guide film 10, and the two guide wheels abut on the surface of the second light guide film 10 respectively; the product conveying device 7 is installed at an interval from the second guide wheel group 12, the product conveying device 7 is configured as a second conveyor belt with a conveying plane parallel to the first light guide film 9, the second conveyor belt and the first conveyor belt 5.5 are on the same straight line, and the conveying plane of the second conveyor belt close to the first light guide film 9 and the conveying plane of the first conveyor belt 5.5 close to the first light guide film 9 are on the same plane; the length of the light guide film product along the transmission direction of the first light guide film 9 is defined as d1, the installation interval between the product conveying device 7 and the second guide wheel group 12 is d2, and the installation interval between the second guide wheel group 12 and the first conveyor belt 5.5 is d3, then $d2<1/2 d1$ and $d3<1/2 d1$.

In the embodiments, the provision of two guide wheel groups facilitates the smoothing of the surface of the first light guide film 9 when transmitted through the dot processing device 3, the cooling device 4, and the cutting device 5, no wrinkles are generated on the product, and the second conveyor belt is installed at an interval from the first guide wheel group 11 and the second guide wheel group 12. The main purpose is to transmit and collect the light guide film product separated from the second light guide film 10.

In order to improve the processing efficiency of the dots of the first light guide film 9, in the present invention, both the first mold base 3.3 and the second mold base 3.4 are set to have a large-size structure, that is, the width of the first light guide film 9 is defined as D, the width of the side of the first mold base 3.3 close to the first light guide film 9 along the width direction of the first light guide film 9 is D1, and the width of the second mold base 3.4 close to the first light guide film 9 along the width direction of the first light guide film 9 is D2, then $D1>D$ and $D2>D$. Due to the size design of the first mold base 3.3 and the second mold base 3.4, the dot formation along the width direction of the first light guide film 9 can be completed at one time when the first pressurizing device 3.1 and the second pressurizing device 3.2 are driven and the first mold base 3.3 and the second mold base 3.4 are drive to transfer the dots to the first light guide film 9, thereby improving processing efficiency. In addition, since the side of the first mold base 3.3 close to the first light guide film 9 is uniformly provided with a plurality of grooves 3.7 in the same straight line, in actual production, the installation number of the first hot-pressing molds 3.5 can be adjusted according to the actual width of the first light guide film 9 to be processed, so that it is always be guaranteed that the dot formation along the width direction of the first light guide film 9 can be completed at one time, and this is also suitable for the dot processing of the first light guide film 9 of each width size.

In the same way, in order to ensure the cooling efficiency of the first light guide film 9 by the cooling device 4, that is, to ensure that the heat exchange of all the surfaces of the first light guide film 9 can be accelerated by the air supply unit to reduce the influence of the unevenness of the cooling of the surfaces of the first light guide film 9 on film quality and performance, the cooling device 4 is designed as follows: the width of the first light guide film 9 is defined as D, the width of the opening of the first air supply unit 4.1 along the width direction of the first light guide film 9 is D3, the width of the opening of the second air supply unit 4.2 along the width direction of the first light guide film 9 is D4, then $D3>D$ and $D4>D$.

The light guide film product processing apparatus of the present invention has a reasonable design and a simple structure. Any two of various hot-pressing molds can be selected to transfer dots on the surface of a first light guide film so as to achieve the effect that both sides of a light guide film product have different dots, thereby greatly improving optical performance, and the cutting device 5 with a replaceable cutting mold 5.3 is used to cut different types of light guide film products, which can avoid damage to the surface of the light guide film, increase the product type without increasing costs, and effectively improve the qualification rate of the product. The light guide film product processing apparatus of the present invention can be widely applied in various occasions.

Although the present invention is disclosed above with preferred embodiments, the present invention is not limited thereto. Those having ordinary skill in the technical field to which the present invention belongs can make various changes and modifications without departing from the spirit and scope of the present invention. Therefore, the scope of protection of the present invention should be subject to the scope defined by the claims.

The invention claimed is:

1. A light guide film product processing apparatus, comprising an unwinding device, a dot processing device, a cooling device, a cutting device, a waste collecting device, a product collecting device, and a linkage controller, wherein the unwinding device is configured to unwind and transmit a first light guide film, and the first light guide film is a light guide film of unformed dots;

the dot processing device, the cooling device, and the cutting device are sequentially installed along the transmission direction of the first light guide film, and the dot processing device, the cooling device, and the cutting device are electrically connected to the linkage controller respectively; the dot processing device is configured to transfer the dots on both sides of the first light guide film, the cooling device is configured to cool the first light guide film after dot processing, and the cutting device is configured to cut the cooled first light guide film to obtain a light guide film product;

the waste collecting device is configured to wind a second light guide film, and the second light guide film is a remaining material after the first light guide film is cut into the light guide film product; the product collecting device is configured to collect the light guide film product; and the included angle formed between the winding and transmission direction of the second light guide film and the transmission direction of the first light guide film is defined as α, wherein α>0.

2. The light guide film product processing apparatus according to claim 1, wherein the dot processing device comprises a first pressurizing device and a second pressurizing device, a first mold base and a second mold base, and a first hot-pressing mold and a second hot-pressing mold, which are symmetrically disposed in the thickness direction of the first light guide film respectively;

the first mold base is installed on the side of the first pressurizing device close to the first light guide film, the first hot-pressing mold is disposed on the side of the first mold base close to the first light guide film, and the plane of the first hot-pressing mold is parallel to the surface of the first light guide film; the second mold base is installed on the side of the second pressurizing device close to the first light guide film, the second hot-pressing mold is disposed on the side of the second mold base close to the first light guide film, and the plane of the second hot-pressing mold is parallel to the surface of the first light guide film;

a heating unit is provided inside each of the first mold base and the second mold base, and the heating unit is configured to heat to soften the first light guide film;

the linkage controller is configured to control to drive the first pressurizing device and the second pressurizing device to move toward or away from each other along the thickness direction of the first light guide film, and when the first pressurizing device and the second pressurizing device move toward each other, the linkage controller at least causes the first hot-pressing mold and the second hot-pressing mold to abut against the surface of the first light guide film; and the linkage controller is also configured to control the starting and stopping of the heating unit inside the first mold base and the second mold base by means of a program, so that the first hot-pressing mold and the second hot-pressing mold transfer dots on the surface of the first light guide film.

3. The light guide film product processing apparatus according to claim 2, wherein the cutting device comprises a third pressurizing device, a third mold base, a cutting mold, and a cutting platform;

the third pressurizing device is installed on the same side as the first pressurizing device, the third mold base is installed on the side of the third pressurizing device close to the first light guide film, and the cutting mold is detachably installed on the side of the third mold base close to the first light guide film; the cutting platform is installed on the same side as the second pressurizing device, and the side of the cutting platform close to the first light guide film is provided with a first conveyor belt with a conveying plane parallel to the first light guide film; and the first conveyor belt corresponds to the position of the cutting mold along the thickness direction of the first light guide film, and the conveying plane of the first conveyor belt close to the first light guide film abuts against the first light guide film.

4. The light guide film product processing apparatus according to claim 3, wherein the side of the third mold base close to the first light guide film is provided with a connecting portion electrically connected to the linkage controller, and the connecting portion is detachably connected to the cutting mold; and the transmission direction of the first light guide film is defined as the front, then the connecting portion has a degree of freedom to rotate parallel to the first light guide film on the third mold base, and a degree of freedom to translate along the front, back, left, and right.

5. The light guide film product processing apparatus according to claim 3, wherein one side of the first hot-pressing mold is provided with a plurality of marking dots that protrude toward the first light guide film side, and the marking dots are configured to print a mark on the first light guide film;

a plurality of CCD positioning cameras are provided on the same side of the outer wall of the third mold base as the first hot-pressing mold that is provided with the marking dots, and the number and positions of the CCD positioning cameras correspond to the number and positions of the marking dots; the CCD positioning cameras are electrically connected to the linkage controller, and are configured to identify the marks on the first light guide film, and generate a sensing signal and send same to the linkage controller; and after receiving the sensing signal, the linkage controller controls to start the cutting device.

6. The light guide film product processing apparatus according to claim 2, wherein the first mold base and the second mold base have the same structure; the first mold base or the second mold base is uniformly provided with a plurality of grooves on the same straight line along its side close to the first light guide film, the first hot-pressing mold is partially embedded in the grooves of the first mold base along its thickness direction, and the second hot-pressing mold is partially embedded in the grooves of the second mold base along its thickness direction; and the heating unit is provided as an electric heating unit, the heat transfer plane of the electric heating unit is parallel to the first light guide film.

7. The light guide film product processing apparatus according to claim 2, wherein the width of the first light guide film is defined as D, the width of the side of the first mold base close to the first light guide film along the width direction of the first light guide film is D1, and the width of the side of the second mold base close to the first light guide film along the width direction of the first light guide film is D2, then D1>D and D2>D.

8. The light guide film product processing apparatus according to claim 1, wherein the cooling device comprises a first air supply unit and a second air supply unit, and a first air extraction unit and a second air extraction unit, which are symmetrically disposed in the thickness direction of the first light guide film;

the first air supply unit comprises a first chamber with an opening facing the first light guide film and a blower connected to the first chamber by means of a pipeline, and the first air extraction unit comprises a second chamber with an opening facing the first light guide film and an air extractor connected to the second chamber by means of a pipeline; the second chamber is disposed in the first chamber, and the distance between the plane where the opening of the second chamber is located and the first light guide film is not less than the distance between the plane where the opening of the first chamber is located and the first light guide film;

the second air supply unit comprises a third chamber with an opening facing the first light guide film and a blower connected to the third chamber by means of a pipeline, and the second air extraction unit comprises a fourth chamber with an opening facing the first light guide film and an air extractor connected to the fourth chamber by means of a pipeline; and the fourth chamber is disposed in the third chamber, and the distance between the plane where the opening of the fourth chamber is located and the first light guide film is not less than the distance between the plane where the opening of the third chamber is located and the first light guide film.

9. The light guide film product processing apparatus according to claim 8, wherein the width of the first light guide film is defined as D, the width of the opening of the first air supply unit along the width direction of the first light guide film is D3, and the width of the opening of the second air supply unit along the width direction of the first light guide film is D4, then D3>D and D4>D.

10. The light guide film product processing apparatus according to claim 1, further comprising a first guide wheel group and a second guide wheel group each provided with two guide wheels, and a product conveying device disposed between the cutting device and the product collecting device, wherein the first guide wheel group is disposed between the unwinding device and the dot processing device, the two guide wheels of the first guide wheel group are symmetrically disposed on both sides in the thickness direction of the first light guide film, and the two guide wheels abut on the surface of the first light guide film respectively; the second guide wheel group group is disposed between the cutting device and the product conveying device, the two guide wheels of the second guide wheel group are symmetrically disposed on both sides in the thickness direction of the second light guide film, and the two guide wheels abut on the surface of the second light guide film respectively;

the product conveying device is installed at an interval from the second guide wheel group, the product conveying device is configured as a second conveyor belt with a conveying plane parallel to the first light guide film, the second conveyor belt and the first conveyor belt are on the same straight line, and the conveying plane of the second conveyor belt close to the first light guide film is located on the same plane as the conveying plane of the first conveyor belt close to the first light guide film; and the length of the light guide film product along the transmission direction of the first light guide film is defined as d1, the installation interval between the product conveying device and the second guide wheel group is d2, and the installation interval between the second guide wheel group and the first conveyor belt is d3, then $d2<1/2 d1$ and $d3<1/2 d1$.

* * * * *